United States Patent [19]

Fuchs et al.

[11] Patent Number: 4,519,997
[45] Date of Patent: May 28, 1985

[54] METHOD FOR IMPROVING THE INITIAL ACTIVITY OF ACTIVATED HYDRAZINE

[75] Inventors: Wilfried Fuchs, Halle-Neustadt; Horst Richter, Bad Dürrenberg; Roland Kober, Leuna; Vendelin Kaufmann, Leuna; Christina Müller, Leuna, all of German Democratic Rep.

[73] Assignee: VEB-Leuna-Werke "Walter Ulbricht", Leuna, Fed. Rep. of Germany

[21] Appl. No.: 473,850

[22] Filed: Mar. 10, 1983

[30] Foreign Application Priority Data

Apr. 22, 1982 [DD] German Democratic Rep. .................................. 2392177

[51] Int. Cl.$^3$ .................. C02B 1/18; C23F 11/14; C23F 11/18
[52] U.S. Cl. .................. 423/265; 210/750; 210/757; 252/188.28; 423/269; 423/407
[58] Field of Search .............. 423/269, 407, 265; 252/188.28; 210/750, 757

[56] References Cited

U.S. PATENT DOCUMENTS

| | | | |
|---|---|---|---|
| 2,780,531 | 2/1957 | Lewis | 423/407 |
| 3,728,281 | 4/1973 | Marks et al. | 252/188.28 |
| 4,022,711 | 5/1977 | Noack | 252/188.28 |
| 4,022,712 | 5/1977 | Noack | 252/188.28 |
| 4,079,018 | 3/1978 | Noack | 252/188.28 |
| 4,124,500 | 11/1978 | Arghiropoulos et al. | 423/269 |

FOREIGN PATENT DOCUMENTS

| | | |
|---|---|---|
| 160314 | 6/1983 | German Democratic Rep. . |
| 160315 | 6/1983 | German Democratic Rep. . |

*Primary Examiner*—John Doll
*Assistant Examiner*—Wayne A. Langel
*Attorney, Agent, or Firm*—Jordan and Hamburg

[57] ABSTRACT

The method for improving the initial activity of activated hydrazine, is used as corrosion protection for reservoir drinking water and for the wet preservation of installation parts, which are no longer being used. It is the goal of the invention to improve the initial activity of hydrazine solutions, which are activated with complexes of trivalent cobalt, with respect to oxygen dissolved in water, and to lower the activator concentration; the object of the invention being to use a suitable coactivator. The object is accomplished in that the activator-rich hydrazine solution additionally contains 2-amino-4-nitrophenol or 2-acetamino-4-nitrophenol or mixtures thereof as coactivator.

10 Claims, No Drawings

METHOD FOR IMPROVING THE INITIAL ACTIVITY OF ACTIVATED HYDRAZINE

BACKGROUND OF THE INVENTION AND PRIOR ART STATEMENT

The invention relates to a method for improving the initial activity of hydrazine with respect to oxygen dissolved in water, in which the hydrazine is activated by adding complexes of trivalent cobalt with inorganic ligands as complex constituents.

Activated hydrazine is used as an agent to remove oxygen from water, especially from reservoir drinking water and from water which is used to preserve installations no longer in use, in order to protect containers, pipes, steam boilers, heat exchangers and other installation parts from corrosion.

Various methods are used for the removal of oxygen dissolved in water. Hydrazine has been preferred, which, when adding suitable activators, immediately reacts at low temperatures with the oxygen dissolved in water, forming innocuous nitrogen. Cationic and anionic complexes of trivalent cobalt with inorganic ligands as complex constituents are suggested as particularly suitable activators (WPC 23F/224246). Even if these activators are considered favorably, there is still the disadvantage of the concomitantly activated hydrazine not reaching its full reaction velocity with respect to the oxygen dissolved in water, immediately from the start. It has now been suggested to eliminate this deficiency either by gassing with air (WPC 23F/224247) or by adding trivalent phenols as coactivators (WPC 23F/227201). These measures result in an improvement of the initial activity, however, only when maintaining a relatively high activator concentration of 0.5 to 1 g per liter of commercial hydrazine solution. In spite of its basically good effectiveness regarding oxygen reduction, this activator concentration may still be too high for certain fields of application.

It is the object of the present invention to improve the initial activity of activated hydrazine with respect to oxygen dissolved in water, and to lower activator concentration, by using as activators, complexes of trivalent cobalt with inorganic ligands as complex constituents.

SUMMARY OF THE INVENTION

It is thus the object of the invention to develop a suitable activator system assuring that hydrazine solutions, having a low concentration of the aforementioned activators, immediately reach a high reaction velocity with respect to oxygen dissolved in water, thus eliminating the need for gassing with air. This object is accomplished by the invention in that the activated hydrazine solution contains 2-amino-4-nitrophenol and/or 2-acetamino-4-nitrophenol as coactivators.

Although aminophenols which have at least two nitro groups per molecule are known as activators, and which are needed in relatively high concentrations (DE-PS No. 2601466), it has been shown that neither 2-amino-4-nitrophenol nor pure acetyl compounds develop satisfactory effectiveness when used as activators.

It was surprisingly found that aqueous hydrazine solutions, prepared in suitable fashion and having activators in the form of cationic or anionic complexes of trivalent cobalt with inorganic ligands as complex constituents, and at the same time containing small amounts of 2-acetamino-4-nitrophenol or 2-amino-4-nitrophenol as coactivators, exhibit excellent velocity concerning reduction of oxygen dissolved in water, immediately from the start. With 220 g $N_2H_4$/l, it is therefore possible to lower the activator content below the usual value of 0.05 to 0.1 weight percent for this substance group with respect to the aqueous hydrazine solution.

DETAILED DESCRIPTION OF THE PREFERRED EMBODIMENTS

Hydrazine solutions, which contain 0.05 to 0.5 g/l cobalt complex as activator, and 0.05 to 0.25 g/l 2-amino-4-nitrophenol or 2-acetamino-4-nitrophenol as coactivator, exhibit high reaction velocities with respect to oxygen. With respect to a maximum use of metal complex compound, hydrazine solutions containing 0.05 to 0.1 g/l sodium-hexanitritocobalt (III) and 0.05 to 0.25 g/l 2-acetamino-4-nitrophenol mixed with 2-amino-4-nitrophenol, are especially suited.

EXAMPLE OF EXECUTION 1 ml of an aqueous hydrazine solution with a content of 220 g hydrazine per liter, containing 0.05 to 0.5 g/l sodium hexanitritocobalt(III) or cobalt (III)-hexammine chloride as activator, and 0.05 to 0.25 g/l 2-amino-4-nitrophenol or 2-acetamino-4-nitrophenol or a mixture of both compounds as coactivator, is added to a liter of water containing oxygen with approximately 6.5 mg $O_2$/l, with the pH-value set at 10.4. The oxygen reduction is measured after 10 minutes. The temperature is 293° K. The following table illustrates the percentage of oxygen reduction after a reaction time of 10 minutes in correlation to the activator- and coactivator concentration, and compared to values obtained in the presence of only one substance in addition to hydrazine.

| $Na_3Co(NO_2)_6$ (g/l) | $Co(NH_3)_6Cl_3$ (g/l) | 2-Acetamino-4-nitrophenol (g/l) | 2-amino-4-nitrophenol (g/l) | $O_2$—reduction after 10 min. % |
|---|---|---|---|---|
| — | — | 1 | — | 13 |
| — | — | 0.5 | — | 9 |
| — | — | 0.25 | — | 3 |
| — | — | — | 2 | 12 |
| 0.05 | — | 0.05 | — | 88 |
| 0.1 | — | 0.1 | — | 96 |
| 0.25 | — | 0.25 | — | 97 |
| 0.5 | — | 0.25 | — | 98 |
| — | — | — | — | — |
| 0.1 | — | — | 0.1 | 89 |
| 0.25 | — | — | 0.25 | 100 |
| 0.05 | — | 0.05 | 0.05 | 86 |
| 0.1 | — | 0.05 | 0.05 | 99 |
| — | 0.25 | — | 0.25 | 100 |
| — | 0.25 | 0.25 | — | 100 |
| — | 0.1 | 0.05 | 0.05 | 89 |
| — | 0.05 | 0.05 | 0.05 | 78 |
| — | 1.6 | — | — | 70 |
| 1.5 | — | — | — | 62 |

We claim:

1. A composition for improving the initial activity of activated hydrazine with respect to oxygen dissolved in water, comprising a trivalent cobalt complex with inorganic ligands as complex constituents, and a component selected from the group consisting of 2-amino-4-nitrophenol, 2-acetamino-4-nitrophenol, and mixtures thereof.

2. The composition of claim 1 comprising from 0.05 to 0.5 g/l cobalt complex and from 0.05 to 0.25 g/l of said component.

3. The composition of claim 2 wherein said cobalt complex is sodium hexanitrito cobalt (III).

4. The composition of claim 2 wherein said cobalt complex is cobalt (III) hexammine chloride.

5. The composition of claim 3 which comprises from 0.05 to 0.1 g/l sodium hexanitrito cobalt (III).

6. A process for improving the initial activity of activated hydrazine with respect to oxygen dissolved in water, which comprises adding to hydrazine a trivalent cobalt complex with inorganic ligands as complex constituents, and a component selected from the group consisting of 2-amino-4-nitrophenol, 2-acetamino-4-nitrophenol, and mixtures thereof.

7. The process of claim 6 wherein from 0.05 to 0.5 g/l cobalt complex and from 0.05 to 0.25 g/l of said component are added.

8. The process of claim 7 wherein said cobalt complex is sodium hexanitrito cobalt (III).

9. The process of claim 7 wherein said cobalt complex is cobalt (III) hexammine chloride.

10. The process of claim 8 which comprises adding from 0.05 to 0.1 g/l sodium hexanitrito cobalt (III).

* * * * *